United States Patent Office 2,773,027
Patented Dec. 4, 1956

2,773,027

HOLLOW CARBOXYMETHYL CELLULOSE BEAD AND METHOD FOR MAKING

William Richards Powers, Penns Grove, N. J., assignor to E. I. du Pont de Nemours and Company, Wilmington, Del., a corporation of Delaware No Drawing. Application May 9, 1952,
Serial No. 287,049

17 Claims. (Cl. 210—8.5)

The present invention relates to a novel article of manufacture, and to a method of preparing this article. More particularly, the present invention relates to an article produced from a salt of carboxymethyl cellulose having particular utility as a dialysis medium, and to a method of manufacturing this article efficiently and economically.

A highly efficient, low cost dialysis medium has long been sought for many industrial purposes, and a number of materials have been proposed. Cellulose derivatives, primarily ethers and esters of cellulose and regenerated cellulose, have been used in the form of gel membranes. The membranes, however, are difficult to prepare, particularly where it is essential to have uniform permeability throughout the membrane, and, due to their fragility, the equipment required for use with these membranes is complicated and expensive. The amount of usable surface area is restricted by the low strength of the membranes, thus reducing the speed of dialysis obtainable.

It is, accordingly, an object of the present invention to provide a low cost, highly-efficient dialysis medium. A further object is to provide a dialysis medium which is sturdy and simple to use. A still further object is to provide a method for preparing such medium from an alkali salt of carboxymethyl cellulose. Additional objects will become apparent as the invention is further described.

I have found that the foregoing objects may be attained and a highly efficient dialysis medium obtained when I provide a membrane in the form of a spherical bead wherein the outer surface of the bead is composed of a water-insoluble salt of carboxymethyl cellulose and the core is essentially a fluid. This outer surface is permeable to crystalloids but impermeable to colloids so that when the bead is introduced into a solution containing a dissolved crystalloid and a colloid, the crystalloid only will pass through the bead surface into the fluid core.

A bead of the foregoing characteristics may be produced by introducing an aqueous solution of a water-soluble salt of carboxymethyl cellulose drop-wise into a coagulating bath comprising an aqueous solution of a metal salt selected from those metals which form water-insoluble salts of carboxymethyl cellulose. Preferably, an alcohol is present in the coagulating bath to moderate the formation of the water-insoluble membrane, and, if desired, cross-linking agents may also be included to increase the strength and resistance of the membrane.

The present invention is illustrated by the following examples, but is not limited to the exact embodiments set forth therein.

*Example I*

A 5% aqueous solution of a relatively low viscosity sodium carboxymethyl cellulose was placed in a container having a discharge tip at the bottom with an orifice of 3.5 millimeters, and allowed to drop at the rate of 80 to 100 drops per minute (about 0.10 milliliter per drop) into a coagulating bath placed about 5 inches below the discharge tip. The coagulating bath consisted of 5% $Al_2(SO_4)_3.18H_2O$, 20% glycerol, and 75% water, the proportions being by weight. The drops assumed a spherical form and retained this form. After fifteen minutes, the beads were transferred to a hardening bath consisting of a 3% aqueous solution of $Al_2(SO_4)_3.18H_2O$, and steeped therein twelve hours. The beads were then washed with running water and drained. The average weight of the beads was 0.06 gram, and a weight of approximately 500 grams was required to rupture an individual bead. 93% of the weight of the bead was water.

*Example II*

Following the procedure described in Example I, beads were prepared from a 3% aqueous solution of low viscosity sodium carboxymethyl cellulose coagulated in a bath consisting of 0.9% $Al_2(SO_4)_3.18H_2O$, 13.8% methanol, and 85.3% water. The beads were hardened in an aqueous solution containing 5% $Al_2(SO_4)_3.18H_2O$, and after washing and draining, had an individual bead strength sufficient to withstand crushing with a weight of less than 55 grams.

*Example III*

A 4% aqueous solution of low-viscosity sodium carboxymethyl cellulose was introduced drop-wise as in Example I into a coagulating bath consisting of 1.7% $Al_2(SO_4)_3.18H_2O$, 16.6% methanol and 81.7% water, and the beads thus formed hardened for 36 hours in an aqueous solution containing 5% $Al_2(SO_4)_3.18H_2O$. The beads were washed and drained, and averaged 0.160 inch in diameter, 0.03 gram in weight and a water content of 90%. A weight of 320 grams was required to rupture individual beads.

*Example IV*

Water-wet beads obtained in Example III were stirred in a solution containing 28.5 grams of a melamine-formaldehyde resin dissolved in 232 grams of water and 26 milliliters of concentrated acetic acid for 46 hours, and then neutralized in a saturated calcium hydroxide solution for 2½ hours, and finally washed with running water and drained. The cross-linked beads were insoluble in alkali solutions containing as much as 16% sodium hydroxide.

*Example V*

Using the procedure described in Example I, a 4% solution of low-viscosity sodium carboxymethyl cellulose was introduced drop-wise into a coagulating bath consisting of 2.1 parts of $Pb(CH_3COO)_2.3H_2O$, 16.7 parts methanol, and 81.2 parts water, and then hardened in a bath containing 3.3% $Pb(CH_3COO)_2.3H_2O$, for 72 hours. The beads, after washing and draining, had an average diameter of 0.190 inch with a membrane thickness of 0.022 inch. The beads flattened without rupturing when squeezed by weights.

In the foregoing examples, a low-viscosity purified sodium carboxymethyl cellulose ether was used to prepare the starting solution. I have found that a solution containing at least 1% cellulose ether is essential for the formation of satisfactory beads, and, for this reason, I prefer to use the low-viscosity material since the solution will flow readily through the orifice. I have prepared solutions containing as high as 7% sodium carboxymethyl cellulose which had satisfactory flow characteristics, and, by using a degraded cellulose ether, such as obtained after treatment with a hypochlorite, as much as 15% aqueous solution would be operable. The beads can be prepared from a technical grade sodium carboxymethyl cellulose ether provided the solution is neutralized prior to introduction into the coagulating bath.

The alcohol in the coagulating bath apparently retards the formation of a rigid outer skin sufficiently to permit the bead to attain a spherical shape, which is highly desirable, but not essential. I prefer to use a water-miscible lower aliphatic alcohol having from 1 to 4 carbon atoms because the specific gravity of the coagulating bath is thus reduced sufficiently to allow the beads to sink to the bottom as they are formed. The amount of alcohol in the coagulating solution will preferably be from 8% to 30% by weight. No alcohol is needed in the hardening bath since the beads will have assumed the preferred spherical form. The use of a separate hardening bath may be eliminated by fortifying the coagulating bath with additional metallic ions, if desired, and where the beads are to be cross-linked, the cross-linking agent may be included in either the coagulating bath or the hardening bath instead of being applied in a separate solution.

A water-insoluble salt of carboxymethyl cellulose can be obtained by adding an aqueous solution of sodium carboxymethyl cellulose to an aqueous solution of a salt of aluminum, titanium, chromium, iron, nickel, copper, zinc, zirconium, silver, tin and lead. The most satisfactory salts for the formation of the beads of the present invention are those of aluminum, iron, nickel, copper, tin and lead. The selection of the metal ion is dependent upon the type of solution to be dialyzed. An aluminum bead is satisfactory for use in neutral or slightly acidic solutions, but is unsuitable for use in alkaline solutions. However, by cross-linking, the bead, regardless of the metal ion present, is rendered more resistant to both acid and alkali solutions.

For dialysis purposes, the beads may range in size from 0.05 inch to 0.30 inch in diameter, the preferred range being from 0.10 to 0.25 inch. Smaller beads are uneconomical to handle, and larger beads lack the structural stability and have reduced surface area per unit volume. The size of the bead is controlled by the discharge aperture and the solution viscosity. The distance from the discharge orifice to the coagulating bath surface is preferably such that a "tear drop" shape is assumed by the drop before entering the solution. Considerable shrinkage, up to 30%, takes place during the coagulation and hardening of the bead. The bead consists essentially of a spherical membrane of a metal salt of carboxymethyl cellulose surrounding a liquid core of water after the washing and draining operation. During dialysis, the crystalloid substance passes into the liquid core, and can thus be removed from the solution being dialyzed.

A simple dialysis is illustrated by the following example:

*Example VI*

350 grams of beads prepared as described in Example III were agitated for one hour in a solution containing 30 grams of sodium chloride, 0.3 gram of blue dyed sodium carboxymethyl cellulose and 269.7 grams of water, and then removed. The sodium chloride content of the free liquid was determined by titration with standard silver nitrate solution, and showed a concentration of 4.88 grams per 100 cc. of solution, indicating that 5.12 grams of sodium chloride per 100 grams of water had diffused into the beads. Based on the water content of the beads, the concentration of sodium chloride in the bead core was 4.82 grams per hundred grams of water, indicating that the concentration of sodium chloride was approximately the same inside and outside the beads before their removal. Several of the beads were cut open, and there was no evidence of penetration of any of the dyed sodium carboxymethyl cellulose.

The actual method of using the present invention in dialysis is not a part of the present invention, but it will be apparent that the beads can be used in either a batch or continuous operation. The crystalloid in the core can be recovered, if desired, by treating the beads with water, thereby reversing the dialysis flow. The beads will find their primary use in the removal of crystalloids from colloid solutions where recovery of the crystalloid is unimportant. Because of their low cost, the beads may be discarded after use, or washed with running water for reuse.

The beads of the present invention may be used for purposes other than the removal of a crystalloid from a solution thereof. For example, it may be desirable to use beads containing an aqueous solution of a crystalloid as a means of introducing the crystalloid into a particular zone at a controlled rate. Therefore, although it is contemplated that the beads will find their greatest utility in dialysis processes, the invention is not restricted to this particular use of the bead.

While the invention has been described at length in the foregoing and specific embodiments shown, I wish to be limited only by the following claims.

I claim:

1. A substantially spherical bead comprising an aqueous core within a surrounding envelope of a water-insoluble metal salt of carboxymethyl cellulose.

2. A dialysis medium comprising a substantially spherical bead having a diameter of from 0.05 inch to 0.30 inch, said bead having a fluid core and an outer surface comprising a water-insoluble metal salt of carboxymethyl cellulose.

3. A dialysis medium comprising a substantially spherical bead having a diameter of from 0.05 inch to 0.30 inch, said bead having a shell of a water-insoluble metal salt of carboxymethyl cellulose enclosing a solute consisting essentially of water.

4. A dialysis medium comprising a substantially spherical bead having a diameter of from 0.05 inch to 0.30 inch, said bead having a shell of a cross-linked water-insoluble metal salt of carboxymethyl cellulose enclosing a solute consisting essentially of water.

5. A dialysis medium comprising a substantially spherical bead having a diameter of from 0.05 inch to 0.30 inch, said bead having a shell of a salt of carboxymethyl cellulose, and a metal selected from the group consisting of aluminum, titanium, chromium, iron, nickel, copper, zinc, zirconium, silver, tin and lead, enclosing a fluid core consisting essentially of water.

6. A dialysis medium as claimed in claim 5, wherein the shell is the aluminum salt of carboxymethyl cellulose.

7. A dialysis medium as claimed in claim 5, wherein the shell is the lead salt of carboxymethyl cellulose.

8. A dialysis medium as claimed in claim 5, wherein the diameter is from 0.10 inch to 0.25 inch.

9. A process for the preparation of substantially spherical beads having an aqueous core within a surrounding envelope of a water-insoluble salt of carboxymethylcellulose which comprises introducing individual drops of an aqueous solution of water-soluble sodium carboxymethyl cellulose into an aqueous solution of a metal salt, said metal salt being selected from the group consisting of aluminum, titanium, chromium, iron, nickel, copper, zinc, zirconium, silver, tin and lead salts, and said aqueous solution of water-soluble carboxymethylcellulose having a concentration in the range of from about 1% to about 15%, by weight, of the cellulose ether.

10. A process for the preparation of a dialysis medium which comprises introducing an aqueous solution of a water-soluble sodium carboxymethyl cellulose drop-wise into a coagulating bath containing an alcohol, water and water-soluble metal salt selected from the group consisting of aluminum, titanium, chromium, iron, nickel, copper, zinc, zirconium, silver, tin and lead salts, said aqueous solution of water-soluble carboxymethylcellulose having a concentration in the range of from about 1% to about 15%, by weight, of the cellulose ether.

11. A process as claimed in claim 10, wherein the alcohol is an ailphatic alcohol having from 1 to 4 carbon atoms.

12. A process for the preparation of a dialysis medium which comprises introducing an aqueous solution of a low-viscosity water-soluble sodium carboxymethyl cellulose drop-wise into a coagulating bath containing an aliphatic alcohol having from 1 to 4 carbon atoms, water, and a water-soluble metal salt selected from the group consisting of aluminum, iron, nickel, copper, titanium, chromium, zinc, zirconium, silver, tin and lead salts, transferring the coagulated drops to a hardening bath containing water and the same metal salt used in the coagulating bath, and, after steeping in said hardening bath, washing said coagulated drops with water, said aqueous solution of water-soluble carboxymethylcellulose having a concentration in the range of from about 1% to about 15%, by weight, of the cellulose ether.

13. A process as claimed in claim 12, wherein the metal salt is an aluminum salt.

14. A process as claimed in claim 12, wherein the metal salt is a lead salt.

15. A process as claimed in claim 12, wherein the washed coagulated drop is steeped in a bath containing a cellulose cross-linking agent.

16. A process as claimed in claim 12, wherein the alcohol in the coagulating bath is methanol.

17. A process for the preparation of a dialysis medium which comprises forming droplets of an aqueous solution of water-soluble sodium carboxymethyl cellulose, passing said droplets through an air space into a coagulating bath comprising a solution of a metal salt selected from the group consisting of aluminum, iron, nickel, copper, titanium, chromium, zinc, zirconium, silver, tin and lead salts in water and an aliphatic alcohol having from 1 to 4 carbon atoms, transferring the coagulated beads thus formed to a bath comprising an aqueous solution of the metal salt used in the coagulating bath, and steeping the beads therein for at least 12 hours, and thereafter washing said beads with running water, said aqueous solution of water-soluble carboxymethylcellulose having a concentration in the range of from about 1% to about 15%, by weight, of the cellulose ether.

References Cited in the file of this patent

UNITED STATES PATENTS

| | | |
|---|---|---|
| 1,996,102 | Dreyfus | Apr. 2, 1935 |
| 2,304,221 | Walsh | Dec. 8, 1942 |
| 2,411,238 | Zender | Nov. 19, 1946 |
| 2,465,343 | Battista | Mar. 29, 1949 |
| 2,495,767 | Reid et al. | Jan. 31, 1950 |